United States Patent [19]

Margida

[11] Patent Number: 4,895,964

[45] Date of Patent: Jan. 23, 1990

[54] QUARTERNARY AMMONIUM PENDANT SILOXANE COPOLYMERS

[75] Inventor: Anthony J. Margida, Marietta, Ohio

[73] Assignee: Union Carbide Chemicals and Plastics Company Inc., Danbury, Conn.

[21] Appl. No.: 214,512

[22] Filed: Jul. 1, 1988

[51] Int. Cl.$^4$ .............................................. C07F 7/10
[52] U.S. Cl. ..................................... 556/425; 556/423
[58] Field of Search ................................ 556/423, 425

[56] References Cited

U.S. PATENT DOCUMENTS

| | | | |
|---|---|---|---|
| 3,203,969 | 8/1965 | Pines et al. | 556/425 |
| 4,006,176 | 2/1977 | Heckert et al. | 556/425 X |
| 4,013,574 | 3/1977 | Leikhim et al. | 556/425 X |
| 4,417,066 | 11/1983 | Westall | 556/425 |
| 4,421,932 | 12/1983 | Rutzen et al. | 564/292 |
| 4,492,802 | 1/1985 | Rutzen et al. | 564/292 |
| 4,503,242 | 3/1985 | Plueddemann | 556/425 X |

FOREIGN PATENT DOCUMENTS 0107088  5/1984  European Pat. Off. .

*Primary Examiner*—Paul F. Shaver
*Attorney, Agent, or Firm*—Paul W. Leuzzi

[57] ABSTRACT

Process for the manufacture of quaternary ammonium pendant siloxane copolymers by the reaction of epoxy pendant siloxane copolymers with a tertiary amine acid salt using a catalytic amount of a free tertiary amine as the catalyst.

12 Claims, No Drawings

QUARTERNARY AMMONIUM PENDANT SILOXANE COPOLYMERS

FIELD OF THE INVENTION

This invention relates to a method for the manufacture of quarternary ammonium pendant siloxane copolymers. More particularly, it pertains to the production of such compounds by the reaction of essentially equivalent amounts of a tertiary amine acid salt and the epoxy groups present in an epoxy pendant siloxane copolymer in the presence of a free tertiary amine as the catalyst.

BACKGROUND

The process disclosed in U.S. Pat. No. 4,492,802, issued to H. Rutzen et al. on Jan. 8, 1985, is the reaction of an epoxide compound having a terminal epoxide group with a salt of a tertiary amine using a quarternary ammonium compound as catalyst to produce the quarternary ammonium compound of the epoxide compound. The patent states the amount of quarternary ammonium compound used as catalyst as being from about 0.5 to about 10 weight percent based on the theoretical weight of the end product and the process requires the addition of this quarternary compound catalyst. The examples show preparation of the tertiary amine acid salt in situ by the reaction of 1.1 moles of the tertiary amine with 1 mole of the salt forming material (the acid), thus leaving 0.1 mole of unreacted free tertiary amine. Thus, the only mole ratio of tertiary amine to tertiary amine acid salt shown in this reference is 0.1:1 and the only catalysts described as useful are the quarternary ammonium compounds. There is no stated recognition that the tertiary amine per se could be a catalyst and there is no suggestion or disclosure of any siloxane compound.

In U.S. Pat. No. 4,421,932, issued to H. Rutzen et al. on Dec. 20, 1983, there is disclosed a process for manufacturing quarternary ammonium compounds by reacting an epoxide compound having a terminal epoxide group with a tertiary amine which is present as both the free amine and as the amine acid salt, followed by the addition of sufficient acid at the end of the reaction to convert all of the quarternary ammonium compound to the salt form. The patent states that from about 50 to about 90 mole percent, preferably about 60 to 80 mole percent, of the tertiary amine is converted to the amine acid salt form by the acid (column 2, line 17 et seq.), thus leaving from 50 to 10 mole percent remaining as the free tertiary amine. Thus, calculations show that the mole ratio of free amine to amine acid salt is from about 0.11:1 to about 1:1 and preferably from about 0.25:1 to about 0.67:1. As shown at column 2, lines 28–30, the reference requires the presence of one epoxide equivalent, one amine equivalent and from about 0.5 to about 0.9, preferably about 0.6 to about 0.8 acid equivalent. This is a considerably higher amount of free amine than was found necessary for the production of quarternary ammonium pendant siloxane compounds by the process of this instant invention; it is to be noted that U.S. Pat. No. 4,421,932 contains no mention of any siloxane compound.

In European patent application No. 0 107 088. filed by R. D. Jerabek et al. and published on May 2, 1984, quarternary ammonium compounds were produced by reacting a monoepoxide and an amine containing an acylic moiety in the presence of an acid or water. The application contains no recognition of the need to control the ratio of amine to acid and no mention of a siloxane compound.

SUMMARY OF THE INVENTION

This invention pertains to a catalytic process for the production of quarternary ammonium pendant siloxane copolymers. The process entails the reaction of a tertiary amine acid salt with an epoxy pendant siloxane copolymer using a miniscule or catalytic amount of a free tertiary amine as the catalyst.

DESCRIPTION OF THE INVENTION

A process has now been discovered for the preparation of quarternary ammonium pendant siloxanes from epoxy pendant siloxanes and tertiary amine acid salts at high efficiency using only catalytic amounts of a free tertiary amine as the catalyst. This process is not only highly efficient but it also eliminates the use of multiple reaction steps, the generation of hazardous waste products, the need to use hazardous or toxic reactants and the molecular redistribution problems often experienced with siloxane reactants.

While many epoxy pendant siloxane copolymers are known, and some quarternary ammonium pendant siloxane copolymers are known, no practical commercially acceptable process has, to the best of our present knowledge, heretofore been known to convert the epoxy pendant siloxane copolymers to the corresponding quarternary ammonium pendant copolymers at high efficiency. That the process of this invention succeeds in accomplishing this was completely unexpected and unpredictable.

In this specification different letter symbols have been used to identify the various siloxane units, as is shown below. However, the molecules can also contain any of the other known siloxane units provided they do not have a deleterious effect on the reaction.

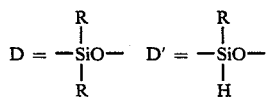

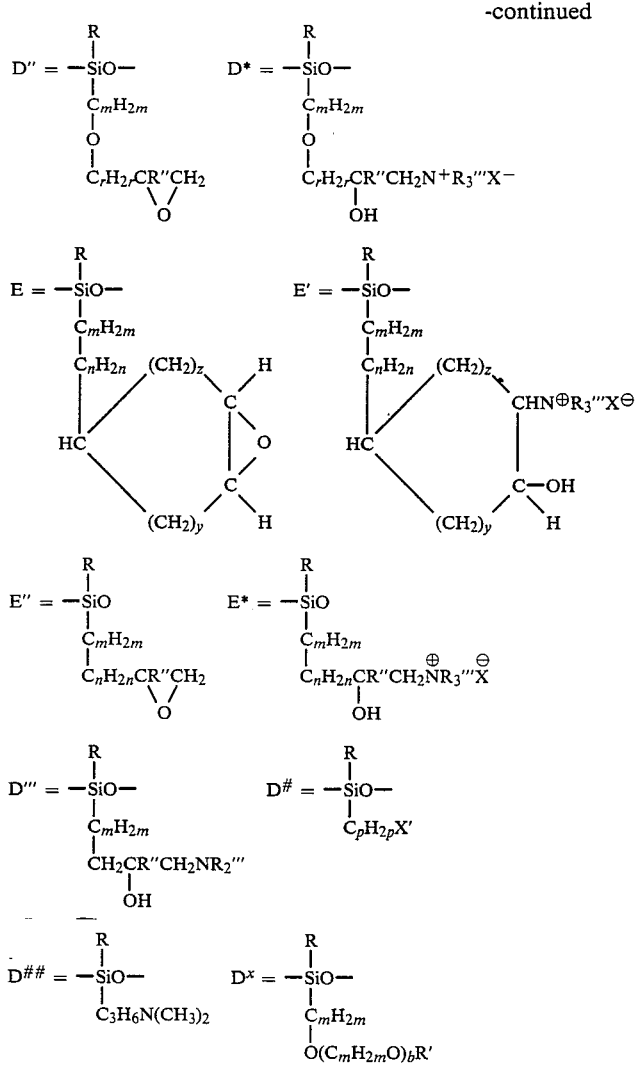

wherein R is a lower alkyl group havinq from 1 to 3 carbon atoms, preferably methyl; R' is hydrogen or alkyl having from 1 to about 4 carbon atoms; R" is hydrogen or methyl; R''' is a substituted or unsubstituted hydrocarbyl group having from 1 to about 20 carbon atoms and can be alkyl, alkenyl, aryl, aralkyl or alkanyl, or heterocyclic, preferably alkyl having from 1 to about 4 carbon atoms; m has a value of from 2 to about 4, preferably 3; n has a value of from 0 to about 10; b has a value of from 1 to about 75, preferably up to about 50; p has a value of 3 to about 20; r has a value of 1 to about 10; y has a value of 1 or 2; z has a value of 1 to 3; X is the negative charged anion of the inorganic or organic acid used as the acid component for preparing the tertiary amine acid salt; and X' is a halogen atom.

The epoxy pendant siloxane copolymers used as starting materials in the process of this invention are known compounds and can be represented by the general formula:

$$MD_cD''_dD_e{}^xE_dE_dM \qquad (I)$$

wherein c has a value of from 0 to about 1,000, preferably from 0 to about 500, most preferably from 10 to 200; the sum of all the d values is a positive number of from 1 to about 200, preferably from 1 to about 100, most preferably from 1 to about 25 and the molecule preferably contains the D" epoxy pendant group; and e has a value of from zero to about 50, preferably zero. The preferred epoxy pendant siloxane copolymers are represented by the general formula:

$$MD_cD''_dM' \qquad (II)$$

and the most preferred are those in which all of the R groups in the M, D, D" and M' moieties are methyl groups.

Illustrative typical epoxy pendant siloxane polymers are listed in Table I, in which the numerals below the siloxane units identified in the heading indicate the average number of each such unit in the polymer molecule.

TABLE I

| M | D | D" | $D^x$ | M |
|---|----|-----|----|---|
| 1 | 20 | 3.2 | 0  | 1 |
| 1 | 70 | 5.1 | 0  | 1 |
| 1 | 13 | 5.5 | 0  | 1 |
| 1 | 30 | 10  | 0  | 1 |
| 1 | 20 | 3   | 0  | 1 |
| 1 | 25 | 3.5 | 30 | 1 |

TABLE I-continued

| M | D | D″ | $D^x$ | M |
|---|---|---|---|---|
| 1 | 150 | 10 | 0 | 1 |

The catalyst used in the process of this invention is a free tertiary amine that has sufficient nucleophilic strength to open the epoxy ring and it is present in a catalytic amount sufficient to catalyze the reaction. This catalytic amount can be at a ratio of from about 0.0005:1 to about 0.05:1 free tertiary amine equivalent to tertiary amine acid salt equivalent, preferably from about 0.001:1 to about 0.005:1 free tertiary amine equivalent to tertiary amine acid salt equivalent used. The tertiary amines are well known compounds and any of the strongly basic tertiary amines that do not have a deleterious effect on the reaction can be used; they can be represented by the general formula $R_3'''N$, wherein $R'''$ has the meanings stated above. Thus, $R'''$ can be methyl, ethyl, propyl, hexyl, 2-ethylhexyl, phenyl, benzyl, phenethyl, cylcohexyl, allyl, and the like.

Illustrative of typical tertiary amines one can mention trimethylamine, triethylamine, methyldiethylamine, tripropylamine, phenyldiethylamine, cyclohexyldimethylamine. dimethylbenzylamine, dimethylphenylamine, pyridine, picoline, methylpyrrolidine, dodecyldimethylamine. etc.

The tertiary amine acid salts which are reacted with the epoxy pendant siloxane polymers to produce the quarternary ammonium pendant siloxane polymers are also known and are readily produced by reaction of the tertiary amine with an acid compound using a 1:1 amine equivalent to acid equivalent ratio. This reaction is well known to the average scientist. As the acid reactant one can use an inorganic acid such as hydrochloric acid, hydrobromic acid, hydroiodic acid, hydrofluoric acid, nitric acid, sulfuric acid, phosphoric acid, carbonic acid, phosphonic acid, boric acid, etc.; or an organic acid or amphoteric compound such as formic acid, acetic acid, propionic acid, benzoic acid, toluene phosphonic acid, methyl hydrogen sulfite ($CH_3SO_3H$), toluene sulfonic acid, etc. The tertiary amine acid salts can be represented by the general formula $R_3'''N$—HX in which HX represents the acid compound reacted with the tertiary amine to form the tertiary amine acid salt. The amount of tertiary amine acid salt added is essentially a stoichiometric amount based on the epoxy equivalents charged.

The quarternary ammonium pendant siloxane copolymers of this invention can be represented by the general formula:

$$MD_cD^*_dD_e^xE'_dE^*_dM' \quad \text{(III)}$$

The preferred quarternary ammonium pendant siloxane copolymers are represented by the general formula:

$$MD_cD^*_dM' \quad \text{(IV)}$$

Illustrative typical quarternary ammonium pendant siloxane copolymers that are produced by the process of this invention are listed in Table II.

TABLE II

| M | D | D* | $D^x$ | M' |
|---|---|---|---|---|
| 1 | 20 | 3.2 | 0 | 1 |
| 1 | 70 | 5.1 | 0 | 1 |
| 1 | 13 | 5.5 | 0 | 1 |
| 1 | 30 | 10 | 0 | 1 |
| 1 | 20 | 3 | 0 | 1 |
| 1 | 25 | 3.5 | 30 | 1 |
| 1 | 55 | 8 | 0 | 1 |
| 1 | 150 | 10 | 0 | 1 |

Illustratively, the process of this invention involves a single step reaction for the efficient, high conversion of epoxy pendant siloxane copolymers containing the epoxy pendant siloxy unit:

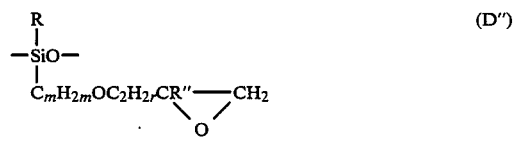
(D″)

or the siloxy unit:

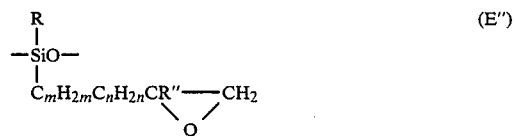
(E″)

or the siloxy unit:

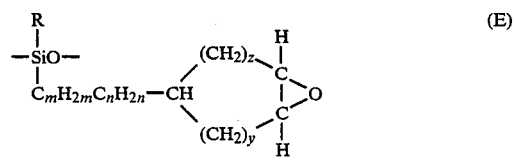
(E)

to quarternary ammonium pendant siloxane copolymers containing the quarternary ammonium pendant siloxy unit:

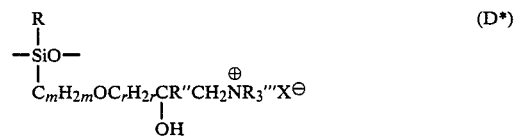
(D*)

or the siloxy unit:

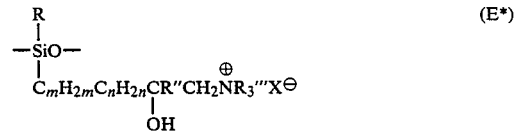
(E*)

or the siloxy unit:

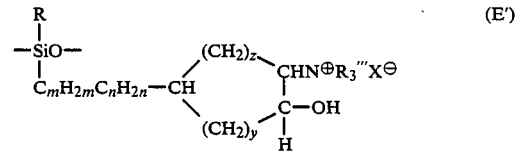
(E')

in high yield using a catalytic amount of free tertiary amine as the catalyst. The amount of free tertiary amine catalyst used is unexpectedly considerably less than the amount of free amine previously considered necessary for the conversion of the epoxy group to the quarternary ammonium group in organic compounds. The process does not require the use of some of the toxic hazardous materials used in the multistep processes previously used to produce the quarternary ammonium pendant siloxane copolymers. Nor does it generate the significant quantities of harmful waste that had to be carefully disposed of and the siloxane by-products that resulted from molecular redistribution of the various siloxy units that constituted the siloxane copolymers.

As previously indicated, U.S. Pat. No. 4,421,932 shows the reaction of the terminal epoxy group with mixtures of tertiary amines and tertiary amine acid salts in which the ratio of free amine to tertiary amine acid salt varies from 0.11:1 to 1:1, with the preferred ratio being from 0.25:1 to 0.67:1. The process also requires the final addition, after completion of the reaction, of an acid compound to convert all of the amine charged to the salt. A related patent, U.S. Pat. No. 4,492,802, shows the reaction of the terminal epoxy group with a salt of tertiary amine using a quarternary amnonium as the catalyst compound at a concentration of from about 0.5 to about 10 weight percent based on the theoretical weight of the end product. In U.S. Pat. No. 4,492,802 the amine acid salt is prepared in situ, with the examples all showing a mole ratio of free amine to amine acid salt of 0.1:1. However, in U.S. Pat. No. 4,492,802 the material identified as the catalyst is the quarternary ammonium salt, not the free tertiary amine or the tertiary amine acid salt. The two latter compounds are identified as the reactants. The terminal epoxide compound in both of the patents are conventional organic compounds, there being no mention of any siloxane compounds or recognition that such compounds could be reacted. Nor was there any apparent awareness of the problems associated with reactions in which siloxane compounds are involved, e.g., redistribution.

A laboratory procedure that has been evaluated for the production of quarternary ammonium pendant siloxanes involves a multi-step process that requires the use of significant amounts of reactants that are considered hazardous and, since the process requires that an excess amount of such reactants be employed, disposal of the waste stream posed significant problems. In addition, due to their nature, undesirable side reactions can occur forming unwanted by products caused by molecular redistribution of the siloxane copolymer. In one such laboratory process the epoxy pendant siloxane group D″ of the structure:

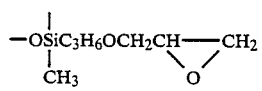

in the epoxy pendant siloxane copolymer of the structure:

$MD_cD''_dM'$ is initially reacted in isopropanol with excess dimethylamine (DMA) to open the epoxy ring and produce the tertiary amine intermediate group D‴ of the structure:

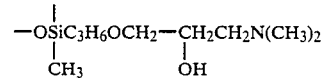

to form the tertiary amine siloxane copolymer of the structure:

$MD_cD_d'''M'$

After removal of excess dimethylamine, the $MD_cD_d'''M'$ siloxane copolymer is reacted in a second step with excess methyl chloride at elevated temperature and pressure to convert the tertiary amine group to the quarternary ammonium siloxane group D* of the structure:

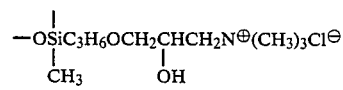

to form the quarternary ammonium pendant siloxane copolymer of the structure:

$MD_cD^*_dM'$

The reaction mixture is then stripped of solvent, unreacted methyl chloride and volatile by-products. In this process, depending upon the time the reactions are kept at the elevated temperatures, the time intervals required to add the dimethylamine reactant and to strip residual dimethylamine, the length of the methyl chloride addition period and the time to remove solvent, large variances in the final siloxane copolymer composition can result. In the ring opening step during the reaction with the secondary amine, it is known that if the amine is not present in excess relative to epoxy ring structure gel formation or crosslinking can occur resulting in crosslinked siloxane copolymer of higher molecular weight rather than formation of the tertiary amine intermediate group D‴. In addition, the presence of residual dimethylamine in the product mixture after the ring opening step fosters unwanted redistribution reactions of the siloxane to occur with formation of some lower molecular weight siloxane species and some higher molecular weight siloxane species. This can be illustrated by the two following reaction sequences, the first sequence involving two siloxane molecules and the second sequence involving a single siloxane molecule.

Sequence 1

$2MD_{20}D_{10}'''M'$ DMA $MD_{<20}D'''_{<10}M' + MD_{>20}D_{>10}'''M'$

Sequence 2

$MD_{20}D_{10}'''M'$ DMA $D_sD_t''' + MD_{20-s}D_{10-t}'''M'$

Some redistribution can also result during the high temperature addition of the methyl chloride in the second reaction step. Use of dimethylamine and methyl chloride on a commercial scale is preferably avoided due to their toxicity. In addition, the reaction requires the use of a considerable excess, which can range from 25% to 100%, of dimethylamine thus generating a significant waste stream. Since both dimethylamine and methyl chloride are gaseous at ambient conditions, handling the waste streams are not straightforward and require considerable care and expense.

The process of this invention can be represented in its broadest form by the chemical equation:

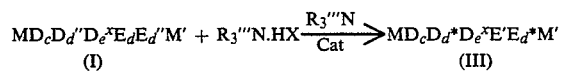

and when the preferred siloxanes are used by the equation:

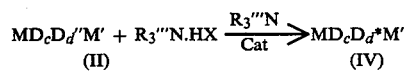

During the reaction an inert solvent can be present such as an aliphatic alcohol. The solvent should have the ability to dissolve a portion of the siloxane copolymer, the tertiary amine catalyst and the tertiary amine acid salt and not have a deleterious effect on the desired reaction. The specific solvent employed is not critical and is used to facilitate handling and feed of reactants to the reactor and carrying out the reaction in the reaction vessel.

The temperature of the reaction can be from about 60° C. to about 100° C. and is not critical. Generally the reaction is carried out at reflux with stirring.

The time will vary depending upon the particular reactants employed, the catalyst, the temperature, and the size of the batch. The reaction is carried out for a sufficiently long period to obtain essentially full utilization of the reactants. Thereafter, one can remove any added solvent by distillation; generally at reduced pressure, though this is not necessary.

The conversion, yield and purity achieved were unexpectedly high and completely unpredictable in view of the many problems heretofore encountered in attempting to produce quarternary ammonium pendant siloxane copolymers. That these results could be attained via a single step process without the use of excessive quantities of hazardous and toxic reactants, without the generation of hazardous waste streams requiring special handling, and without indication of molecular weight degradation or molecular redistribution were completely unpredictable and unexpected.

In the process of this invention there is reacted an equivalent or stoichiometric amount of the tertiary amine acid salt $R'''_3N \cdot HX$ per epoxy equivalent present in the epoxy pendant siloxane copolymer using as catalyst a catalytic amount of free tertiary amine The amount of catalyst used is miniscule and consequently there is never a sufficient quantity of free amine present at any one time to cause any significant siloxane copolymer degradation or redistribution. The free amine catalyst is present in the equivalent ratio of free amine to tertiary amine acid salt previously stated.

The quarternary ammonium pendant siloxane copolymers find utility in hair care formulations and as antistatic agents.

The following examples serve to further illustrate the invention but are not intended to be limitative thereof.

EXAMPLE 1

A 500 ml three-neck flask was equipped with a stirrer, addition funnel, dry ice/acetone condenser, thermocouple and electric heating mantle. A nitrogen blow by was placed on the outlet from the dry ice/acetone condenser.

A solution of trimethylamine in isopropanol was prepared by sparging the amine through the isopropanol. The resulting solution had an amine concentration of 0.0027 milliequivalents per gram.

The flask was charged with 18.6 g of trimethylammonium chloride (0.195 equivalent) and 9.05 g of isopropanol was added and stirred. Then 68.9 g of the trimethylamine/isopropanol solution (0.000186 trimethylamine equivalent) was added with moderate agitation. To the stirred solution there was rapidly added 77.95 g of the epoxy pendant siloxane copolymer of the formula $MD_{30}D''_{10}M'$ (0.192 oxirane equivalent) over a five minutes period having an epoxy ring content of about 2.53 milliequivalents per gram and the structure:

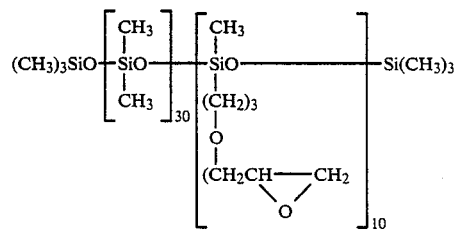

The contents were stirred and heated to 80° C.; about 5 minutes after this temperature was reached all of the trimethylammonium chloride had gone into solution. After heating and stirring at 80° C. for 4.5 hours the flask was cooled and sparged overnight with dry nitrogen. The quarternary ammonium pendant siloxane copolymer produced had the formula $MD_{30}D^*_{10}M'$

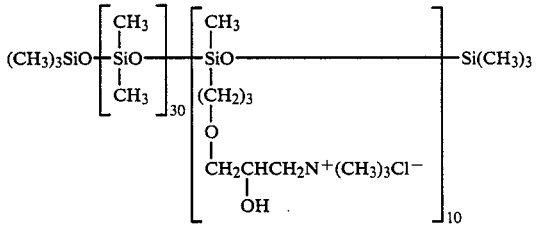

A 61.66 g portion of the reaction product mixture and 20 g of propylene glycol were charged to a rotovap and stripped at 45° C. at a nine speed for 1.5 hours to remove isopropanol and other low-boiling materials. In this example the ratio of free tertiary amine equivalent to tertiary amine acid salt equivalent is 0.001:1.

EXAMPLE 2

Run A—The reactor equipment described in Example 1 was charged with 26.3 g of trimethylammonium chloride (0.275 equivalent). A 0.028 g portion of triethylamine (0.000275 equivalent) was weighed in a small beaker and transferred to the reactor; the beaker was rinsed several times with a total of 100 g of isopropanol, the rinsings being added to the reactor. To the stirred reactor contents 101.2 g of the epoxy pendant siloxane copolymer of the formula $MD_{30}D''_{10}M'$ (0.25 oxirane equivalent) and the structure:

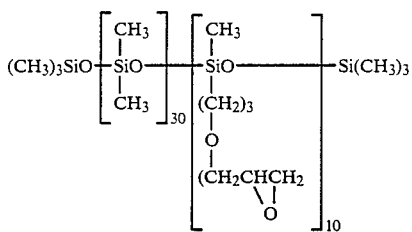

were added via the addition funnel over a 15 minute period. The reaction mixture was stirred and heated to 80° C. to form a clear solution. After heating and stirring at about 80° C. for about 4 hours the quarternary ammonium pendant siloxane copolymer of the formula $MD_{30}M^*_{10}M'$ and the structure:

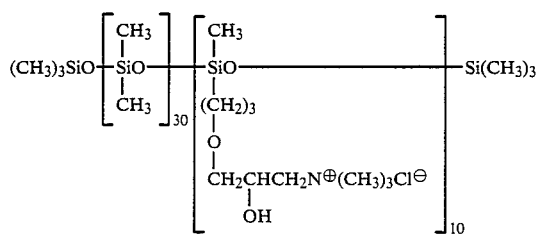

was recovered and stored in a sealed container.

In Run A the ratio of free tertiary amine equivalent to tertiary amine acid salt equivalent was 0.001:1. There was no evidence of precipitation or gel after more than 11 months of storage.

Run B—For comparative purposes the reaction described in Run A was repeated but with the omission of the trimethylammonium chloride salt. Thus the ratio of free tertiary amine equivalent to tertiary amine acid salt equivalent is zero. The end-product obtained in this reaction was fully gelled by the end of the sixth storage day.

In this comparative experiment 2.78 g of triethylamine (0.0275 equivalent) and 100 g of isopropanol were added to the flask, followed by 101.2 g of the same siloxane copolymer of Run A from a beaker. After heating and stirring at about 80° C. for about 6 hours the reaction mixture was cooled, recovered, and stored in a sealed container. The material gelled within six days.

Run C—For comparative purposes the reaction described in Run A was again repeated using a free tertiary amine equivalent to tertiary amine acid salt equivalent of 0.1:1, the ratio used by H. Rutzen et al. in U.S. Pat. No. 4,492,802. In this instance gelation was noted within the sixth month of storage.

In this comparative experiment 26.3 g of trimethylammonium chloride (0.275 equivalent), 2.78 g of triethylamine (0.0275 equivalent), 0.1:1 ratio, and 100 g of isopropanol were added to the reactor, stirred and 101.2 g of the same siloxane copolymer was slowly added from a beaker. After heating and stirring at about 80° C. for about six hours the reaction mixture was cooled, recovered, and stored in a sealed container. Gel particle formation was noticed within about six months. IR scan of the particles indicated it was a dimethyl siloxane type gel.

What is claimed is:

1. A process for producing a quarternary ammonium pendant siloxane copolymer containing in the copolymer backbone the quarternary ammonium pendant siloxy unit of the structure:

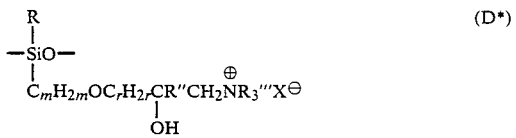

or the siloxy unit:

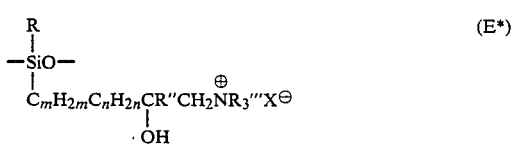

or the siloxy unit:

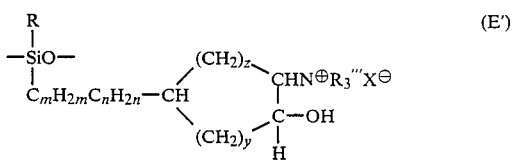

which comprises reacting an epoxy pendant siloxane copolymer containing in the copolymer backbone the epoxy pendant siloxy unit of the structure:

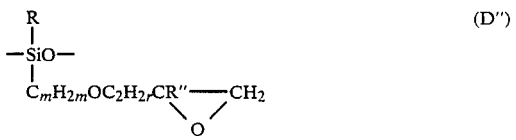

or the siloxy unit:

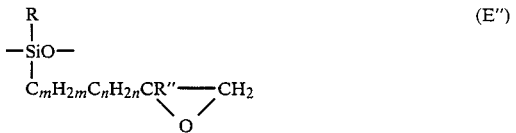

or the siloxy unit:

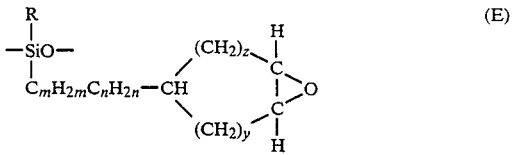

with a tertiary amine acid salt of the general formula $R_3'''N \cdot HX$ in contact with a catalytic amount of free tertiary amine catalyst of the general formula $R_3'''N$, said catalytic amount being at a ratio of from about 0.0005:1 to about 0.05:1 free tertiary amine equivalent to tertiary amine acid salt equivalent, wherein R is an alkyl group having from 1 to 3 carbon atoms;

R'' is hydrogen or methyl;

R''' is a hydrocarbyl group having from 1 to about 20 carbon atoms;

X represents the charged anion of the inorganic or organic acid of the acid component used in preparation of the tertiary amine acid salt;

r has a value of from 1 to about 10;

m has a value of from 2 to about 4;

n has a value of from 0 to about 10;

y has a value of 1 or 2; and z has a value of 1 to 3.

2. A process as claimed in claim 1 wherein said quarternary ammonium pendant siloxane copolymer has the general formula:

$$MD_cD^*{}_dD^x{}_eE^E{}_dE_d{}^*M'' \quad (III)$$

and said epoxy pendant siloxane copolymer has the general formula:

$$MD_cD''{}_dD^x{}_eE_dE_d'' \, M' \quad (I)$$

wherein:

$M=R_3SiO-$, $M'=R_3Si-$, $$D = \begin{array}{c} R \\ | \\ -SiO- \\ | \\ R \end{array},$$

$$D^x = \begin{array}{c} R \\ | \\ -SiO- \\ | \\ C_mH_{2m} \\ | \\ O(C_mH_{2m}O)_bR' \end{array}$$

$D^*$, $D''$, E, $E^*$, E', E'', R, R''', HX, m and n are as defined in claim 1; and R' is hydrogen or alkyl having from 1 to about 4 carbon atoms;

b has a value of from 1 to about 75;

c has a value of from 0 to about 1,000;

e has a value of from 0 to about 50; and the sum of the d values is a positive number of from 1 to about 200.

3. A process as claimed in claim 2 wherein said quarternary ammonium pendant siloxane copolymer has the general formula:

$$MD_cD^*{}_dM' \quad (IV)$$

and said epoxy pendant siloxane copolymer has the general formula:

$$MD_cD''{}_dM' \quad (II)$$

wherein M, D, $D^*$, D'', M', c and d are as defined in claim 2.

4. A process as claimed in claim 1 wherein said catalytic amount is at a ratio of from about 0.001:1 to about 0.005:1 free tertiary amine equivalent to tertiary amine acid salt equivalent.

5. A process as claimed in claim 2 wherein said catalytic amount is at a ratio of from about 0.001:1 to about 0.005:1 free tertiary amine equivalent to tertiary amine acid salt equivalent.

6. A process as claimed in claim 3 wherein said catalytic amount is at a ratio of from about 0.001:1 to about 0.005:1 free tertiary amine equivalent to tertiary amine acid salt equivalent.

7. A process as claimed in claim 1 wherein R and R''' are methyl, R'' is hydrogen, m is 3 and X is chlorine.

8. A process as claimed in claim 2 wherein R and R''' are methyl, R' and R'' are hydrogen, $(C_mH_{2m}O)$ is $(C_2H_4O)$ and X is chlorine.

9. A process as claimed in claim 8 wherein $(C_mH_{2m}O)$ is $(C_3H_6O)$.

10. A process as claimed in claim 3 wherein the R and R''' groups are methyl, R'' is hydrogen, m is 3 and X is chlorine.

11. A process as claimed in claim 3, wherein the M group is $(CH_3)_3SiO-$, the D group is $$\begin{array}{c} CH_3 \\ | \\ -SiO- \\ | \\ CH_3 \end{array}, \text{ the } D^* \text{ group is } \begin{array}{c} R \\ | \\ -SiO- \\ | \\ C_3H_6OCH_2CHCH_2\overset{\oplus}{N}(CH_3)_3\overset{\ominus}{Cl} \\ | \\ OH \end{array}$$

the D'' group is $$\begin{array}{c} R \\ | \\ -SiO- \\ | \\ C_3H_6OCH_2CH\underset{O}{\overset{}{-\!\!\!-\!\!\!-}}CH_2 \end{array}$$

and M' is $(CH_3)_3Si-$.

12. A process as claimed in claim 11 wherein the catalyst is trimethylamine and the tertiary amine acid salt is trimethylamine hydrochloride.

* * * * *